United States Patent [19]

Michalski

[11] Patent Number: 5,573,365
[45] Date of Patent: Nov. 12, 1996

[54] TARP LOADER AND RELATED METHOD

[76] Inventor: Daniel T. Michalski, 2270 W. Laskey Rd., Toledo, Ohio 43613

[21] Appl. No.: 431,914

[22] Filed: Apr. 28, 1995

[51] Int. Cl.$^6$ .................................................. B65G 65/00
[52] U.S. Cl. ........................ 414/417; 414/539; 414/786
[58] Field of Search ...................................... 414/539, 527, 414/509, 467, 786, 393, 417; 296/98

[56] References Cited

U.S. PATENT DOCUMENTS

| | | | |
|---|---|---|---|
| 205,231 | 6/1878 | Archibald | 414/393 X |
| 223,082 | 12/1879 | Tyler | 414/393 |
| 1,088,100 | 2/1914 | Saunders et al. | 414/539 |
| 1,207,795 | 12/1916 | Riekenberg | 414/393 |
| 1,578,431 | 3/1926 | Haman | 414/393 |
| 2,876,917 | 3/1959 | King | 414/539 |
| 3,045,846 | 7/1962 | Clark | 414/539 X |
| 3,443,703 | 5/1969 | Matsumoto | 414/539 |
| 3,774,958 | 11/1973 | Thorpe | 296/98 |
| 4,023,857 | 5/1977 | Killion | 296/98 |
| 4,172,614 | 10/1979 | Guido, Jr. | 296/98 X |
| 4,212,492 | 7/1980 | Johnsen | 296/98 |
| 4,277,220 | 7/1981 | Wiley | 414/539 |
| 4,335,915 | 6/1982 | Knapp | 296/98 |
| 4,518,193 | 5/1985 | Heider et al. | 296/98 |
| 4,673,208 | 6/1987 | Tsukamoto | 296/98 |
| 4,915,439 | 4/1990 | Cramaro | 296/98 |
| 5,004,032 | 4/1991 | Pedersen | 160/84 |
| 5,050,923 | 9/1991 | Petelka | 296/98 |
| 5,054,840 | 10/1991 | Wilhite | 296/98 |
| 5,156,518 | 10/1992 | VanMatre | 414/527 |
| 5,186,231 | 2/1993 | Lewis | 160/310 |
| 5,211,441 | 5/1993 | Barkus et al. | 296/104 |
| 5,328,228 | 7/1994 | Klassen | 296/98 |

FOREIGN PATENT DOCUMENTS 799138  8/1958  United Kingdom .................. 414/539

*Primary Examiner*—David A. Bucci
*Attorney, Agent, or Firm*—Brinks Hofer Gilson & Lione

[57] ABSTRACT

The preferred embodiment of the present invention contemplates a tarp loader and related method, that is, a device which deploys a tarp to cover a receptacle having an open top, e.g., an open vehicle bed, while simultaneously loading various materials into the receptacle. The material to be loaded is placed on the surface of the tarp and the tarp is then wound onto a roller. As the tarp is wound onto the roller, the tarp carries the material up and over the side wall of the receptacle. The loading procedure is complete when the tarp is stretched taut across the open top of the receptacle. In an alternate embodiment, the tarp loader is configured so that a loading and unloading operation are both possible. As the tarp is deployed, material is carried into the receptacle as the tarp is wound onto a roller which is mounted on a pair of pivot arms. For unloading, the tarp is again wound on the roller, the tarp carrying the material up and over the side wall of the receptacle and depositing it adjacent thereto.

16 Claims, 7 Drawing Sheets

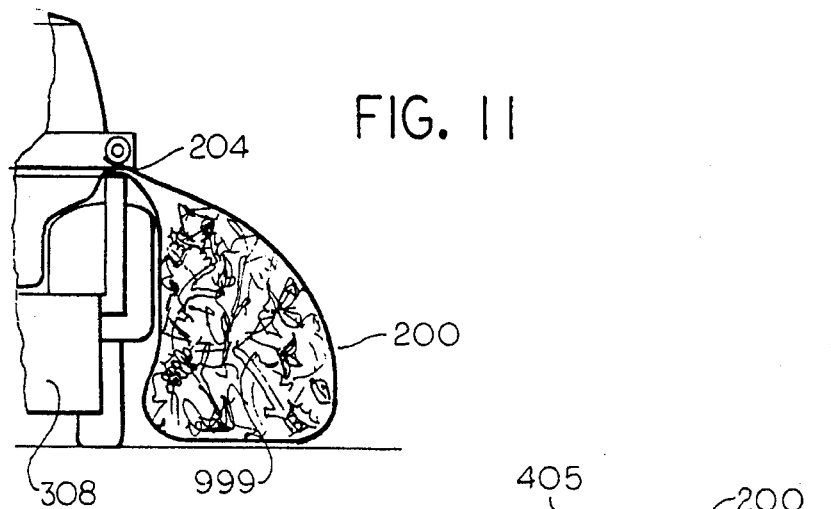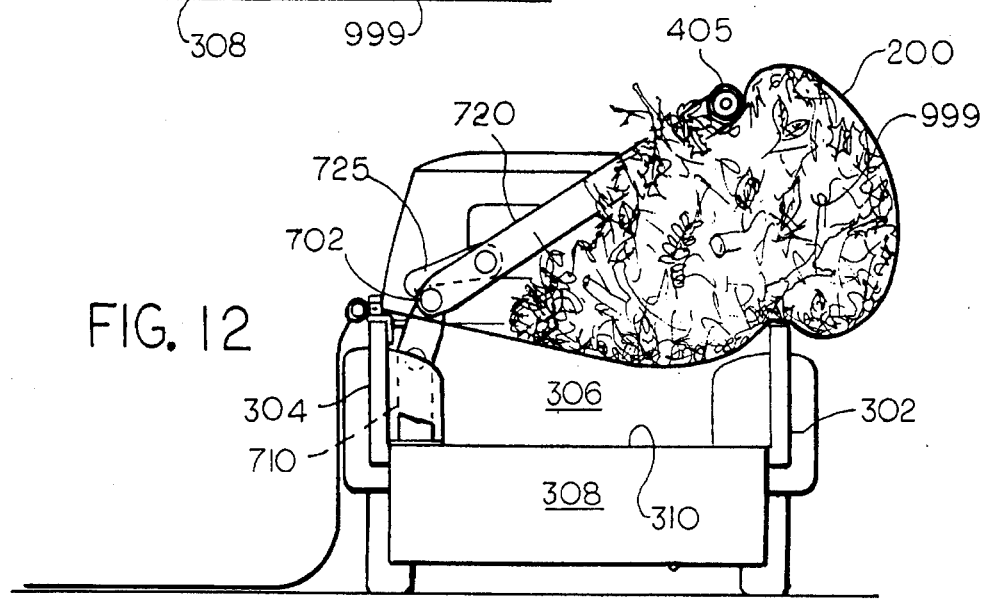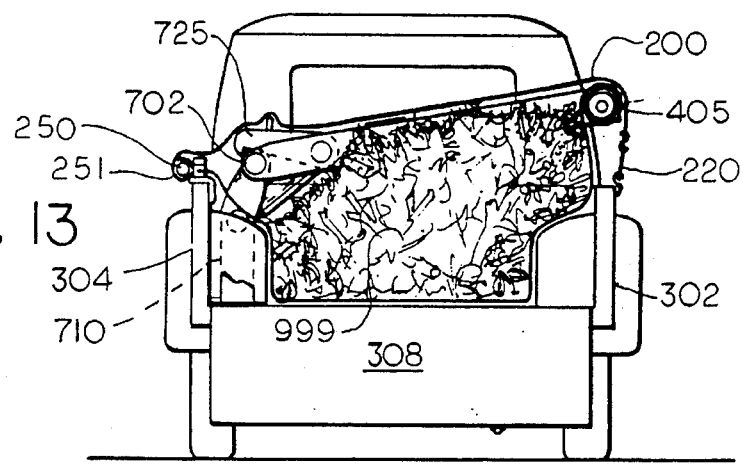

TARP LOADER AND RELATED METHOD

BACKGROUND

There are countless numbers of items and bulk materials which are routinely handled, including agriculture products, municipal solid waste, yard waste, and industrial products. These materials are often loaded into and unloaded from containers having open tops.

Examples include the opens beds of vehicles such as dump trucks, pickup trucks, wagons, railway freight cars, etc. Because of the open nature of the beds, there are also numerous methods and devices for the covering (and uncovering) of these open beds. Covering vehicle beds is necessary to protect the material being hauled from being damaged by objects falling from above as well as to protect innocent passers-by from being injured by material which may inadvertently exit the vehicle bed during transport. Especially useful are flexible sheets of material, such as tarps, which are stretched over the open beds of vehicles. Tarps provide a cheap, effective cover for open vehicle beds and are fairly easy to deploy and stow in a timely manner.

One example for the use of tarps to cover vehicle beds is in the field of landscaping. One concern is the safe transport of tools, topsoil, piping and many other items which frequently need to be delivered to a work site. Another concern arises after the work is complete; many jobs often result in debris which needs to hauled away, such as clippings from trimmed plants (trees, shrubs, grass, etc.), earth, trash, and the like. Because of the dual need of the landscaper to both cover the open bed of his vehicle and easily load and unload material, it would be highly beneficial to combine the two functions, thus enabling him to load and unload diverse material while at the same time deploying or stowing the tarp which is so frequently used in the business.

While there are many devices on the market which do an adequate job of covering and uncovering the load, none attempt to combine the loading/unloading procedures with the deployment/stowing of the tarp. In each case, the material to be hauled is first loaded into the vehicle as a separate step of the hauling process, then the tarp is deployed in some way to cover the vehicle bed. Upon arrival at the work site, the tarp then has to be removed and stowed in some manner before the material can be unloaded. The separate steps of loading and unloading the material takes valuable time which could otherwise be used to accomplish the desired work. In addition, large loads require large tarps which are too bulky and heavy for manipulation by a single operator.

For the foregoing reasons, there is a need for a device and method which combine the functions of deploying and stowing a tarp and the loading and unloading of material to and from a receptacle having an open top, all of which capable of being accomplished by a single operator.

SUMMARY

The present invention allows the loading and/or unloading process to be completed simultaneously with the deployment and/or stowing of a tarp, thus eliminating the additional time needed to perform the steps separately. In the preferred embodiment and method, the top of a first side wall of a vehicle bed has a guide bar attached which extends the length of the side wall and forms a slot between the top of the side wall and the guide bar. A roller arrangement is mounted to a second side wall and functions to roll up the tarp.

To initiate the loading procedure, a tarp of conventional construction is looped over the guide bar, threaded back through the slot, and pulled down the first side wall. The tarp is then fixed to the first side wall by tarp straps or other means. The majority of the tarp is stretched out on the ground along side of the vehicle. The material to be transported is then placed onto the outstretched tarp. The edge of the tarp farthest from the vehicle is then pulled back over the material, over the open bed, and attached to the roller. The roller is then rotated, preferably driven by an electric motor which is mechanically linked to the roller via conventional means. As the roller rotates, the tarp is wound onto the roller, consequently pulling the material up and over the first side wall into the vehicle bed. The rotation of the roller is stopped when the tarp is stretched taut across the open top of the vehicle bed. The material may then be hauled in an ordinary way with no risk to either the material or the general public.

In an alternate embodiment of the present invention, the device is configured such that a loading and unloading procedure may be incorporated with the deployment and stowing of the tarp. In this instance, the structure of the apparatus is similar to the preferred embodiment except that the roller is mounted on a pair of pivot arms which are attached to the second side wall of the vehicle, on which the guide bar is also mounted. The pivot arms are of sufficient length so that when in the substantially horizontal "load" position, the roller itself is located near the top of the first side wall. The tarp is then manipulated such that one portion is stretched out on the ground along side the vehicle (as in the previously described loading process), the middle portion is draped across the floor of the vehicle bed, and one edge of the tarp is fed through the slot formed by the guide bar and the top of the second side wall. The edge of the tarp is then secured to the second side wall. The material to be loaded is placed onto the portion of the tarp stretched out on the ground in a manner identical to that described above. The roller is rotated (again, preferably driven by an electric motor). As the tarp is wound onto the roller, the pivot arms allow the roller to follow the bulk of the material as it passes over the first side wall and into the bed. After the material is deposited into the vehicle bed, the far edge of the tarp is unattached from the side wall and attached to the roller. The roller is rotated once more. The tarp is drawn tighter together and the material is compressed within the tightened tarp in the vehicle bed. The load is now stable and secure in the bed, ready to safely transport.

The unloading procedure is as follows. The roller is rotated such that a portion of the tarp is unwound from the roller. The pivot arms are then locked into an upright "unload" position. The unwound portion of the tarp is fed through the slot and attached to the second side wall. The roller is again rotated. As the tarp is wound back onto the roller, the material to be unloaded is lifted up along the second side wall by the tarp and is ultimately lifted over the second side wall and out onto the ground adjacent to the vehicle. The tarp is unattached from the second side wall and wound up completely onto the roller. If needed, the edge of the tarp can be attached to the first side wall instead of the second, allowing the material to be unloaded over the first side wall instead of the second. The pivot arm assemblies can then be returned to the "load" position and the vehicle is ready for the next work assignment.

Accordingly, it is an object of the present invention to provide a means for handling materials which combines the loading and unloading processes with the deployment and stowing of a tarp.

It is a further object of the present invention to provide the above-described means for handling materials which is safe, easy to use, efficient, and capable of being managed by a single operator.

For a further understanding of the present invention and the objects thereof, attention is directed to the drawings and the following brief description thereof, to the detailed description, and to the appended claims.

BRIEF DESCRIPTION OF THE DRAWINGS

FIG. 11 is a rear elevational view of the alternate embodiment showing another step in the loading process.

FIG. 12 is a rear elevational view of the alternate embodiment showing yet another step in the loading process.

FIG. 13 is a rear elevational view of the alternate embodiment showing the final step in the loading process.

DETAILED DESCRIPTION

Figure 1:
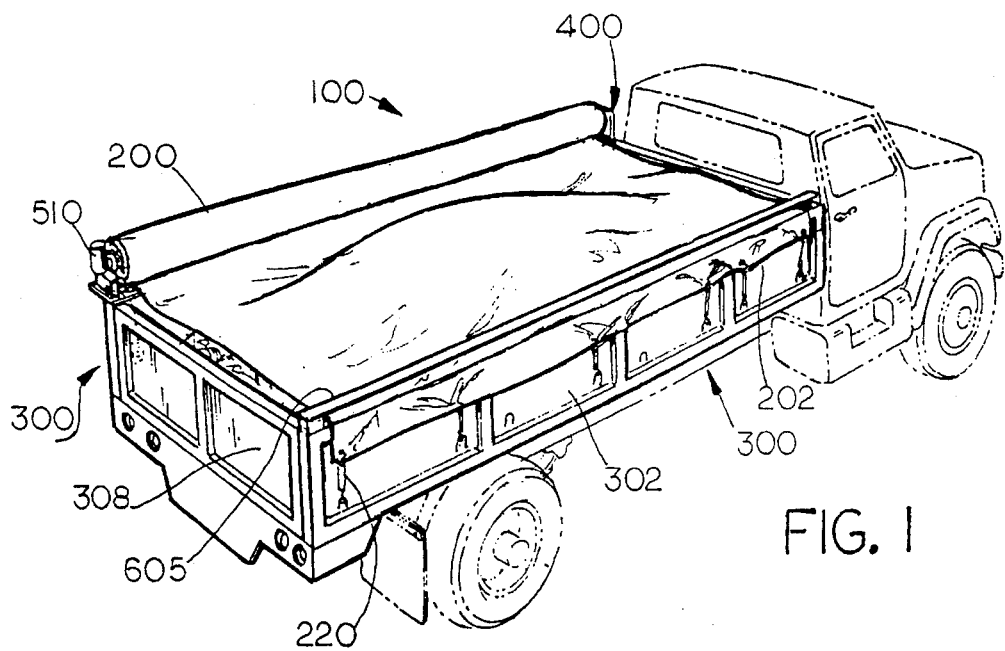
FIG. 1 is a perspective view of an embodiment of the present invention mounted on a vehicle.

Tarp loader 100, shown in FIG. 1, includes tarp 200, receptacle 300, roller assembly 400, motor arrangement 500, guide bar assembly 600, and other associated components.

Tarp 200 is a flexible sheet having generally constant dimensions. It may be constructed of a woven textile material, coated or uncoated, or can be an extruded sheet of plastic material, or the like. Tarp 200 includes near edge 202, far edge 204, front edge 206, and rear edge 208. Vehicle bed 300 is the compartment in which material is hauled, and is defined by first side wall 302, second side wall 304, front wall 306, rear wall 308, and floor 310. Rear wall 308 may be a conventional tailgate, hinged either at its bottom or one side, for traditional loading and unloading from the rear of the vehicle. Vehicle bed 300 is open at the top.

Figure 4:
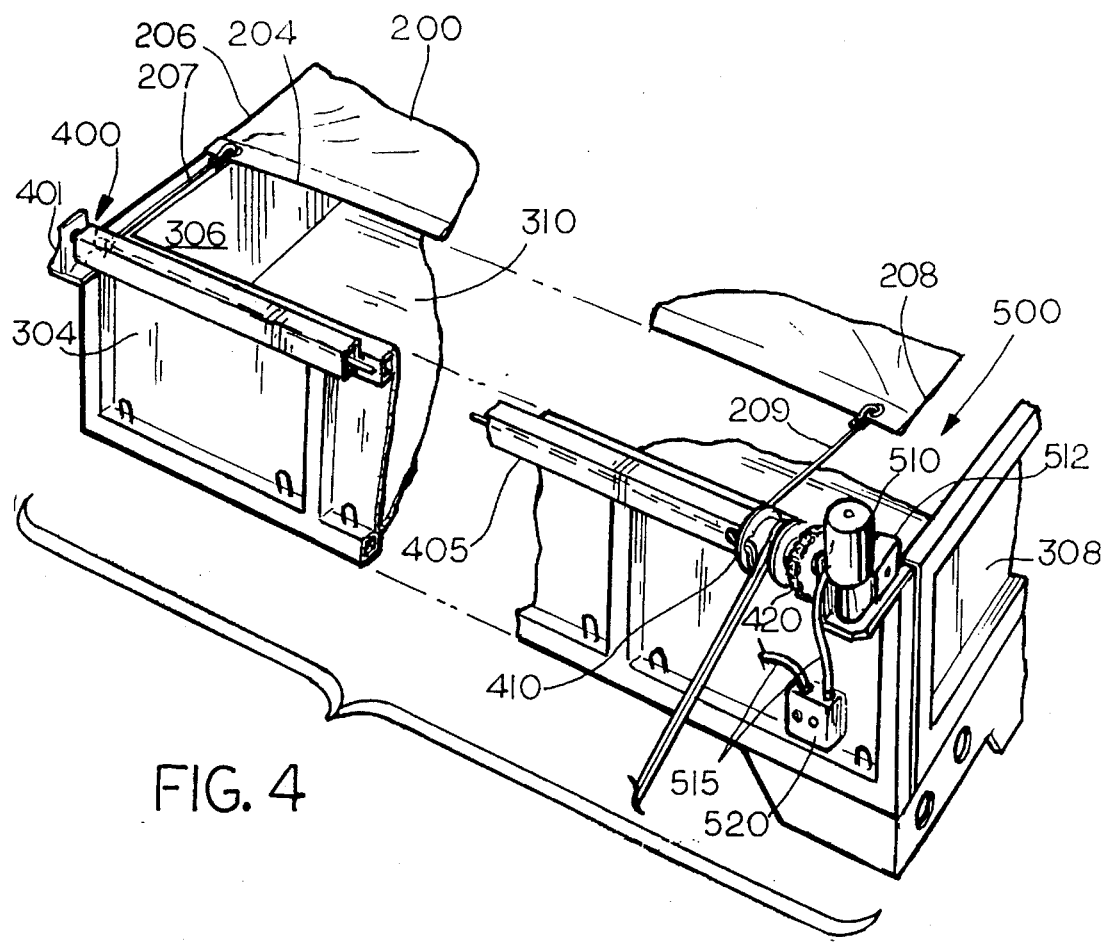
FIG. 4 is an expanded perspective view of the second side wall and the roller assembly of the preferred embodiment of the present invention.
Figure 5:
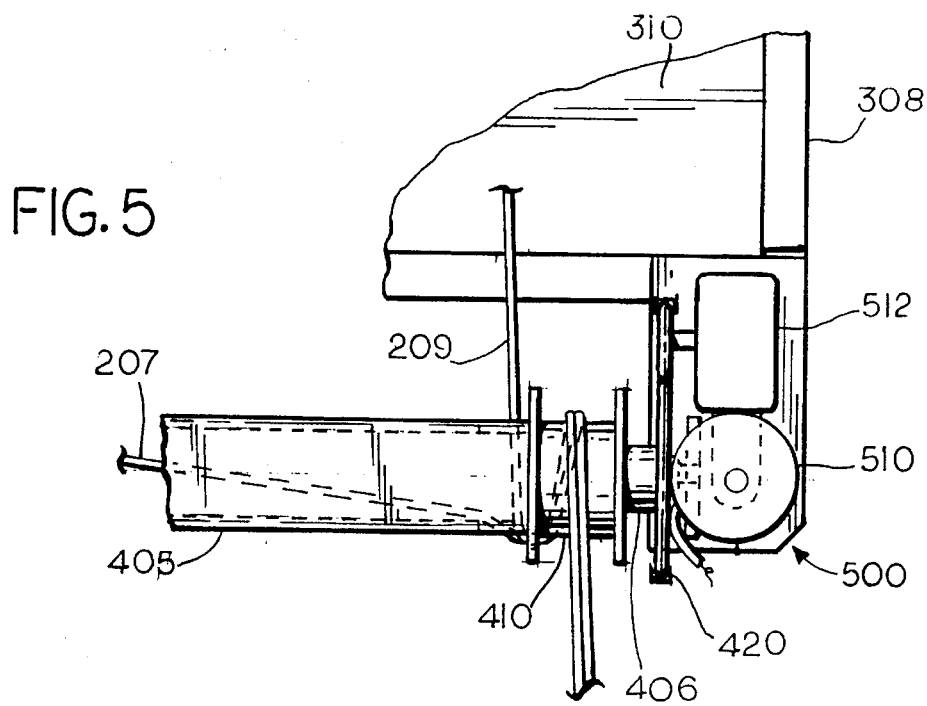
FIG. 5 is an expanded top plan view of a section of the roller assembly of the preferred embodiment of the present invention.

Roller assembly 400, best shown in FIGS. 4 & 5, includes roller brackets 401, roller 405, roller drum 410, and roller sprocket 420. Roller 405 is mounted between roller brackets 401, one of which is mounted on the top of second side wall 304 near front wall 306 and the other of which is mounted on the top of second side wall 304 near rear wall 308. Roller drum 410 is axially connected to roller 405, which in turn is axially connected to roller sprocket 420.

Roller 405 is driven by motor 510 which is mechanically linked to roller 405 by gearbox 512 and roller sprocket 520. Motor 510 is electrically connected to motor controls 520 via wiring 515.

Figure 6:
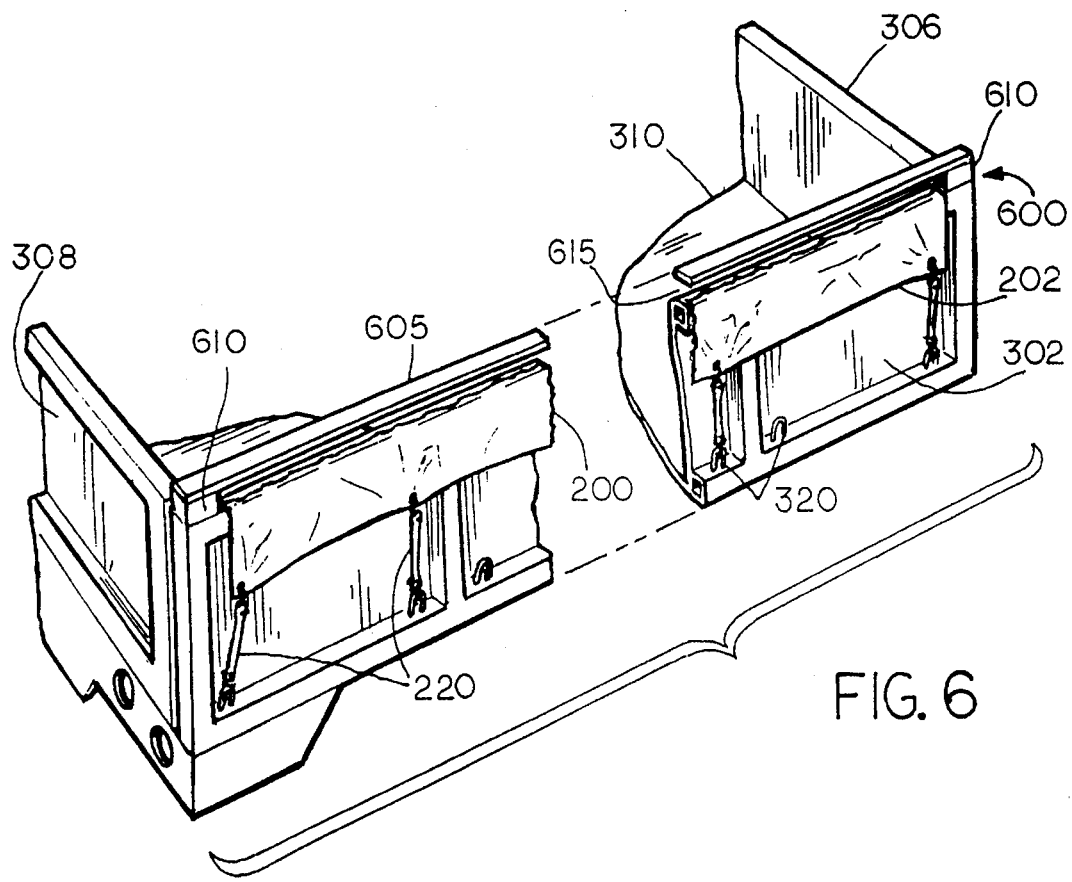
FIG. 6 is an expanded perspective view of a section of the near wall and guide rail assembly of the preferred embodiment of the present invention.

Guide bar assembly 600, best shown in FIG. 6, includes guide bar 605 and guide bar brackets 610. Guide bar 605 is mounted to guide bar brackets 610, one of which is mounted on the top of first side wall 302 near front wall 306 and the other of which is mounted on the top of first side wall 302 near rear wall 308. Slot 615 is formed between guide bar 605 and the top of first side wall 302.

Figure 2:
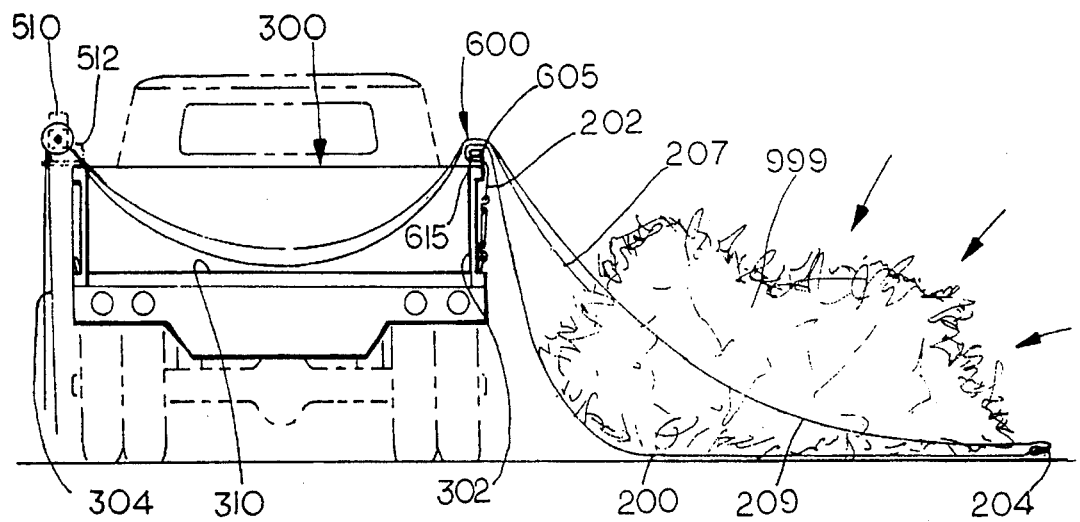
FIG. 2 is rear elevational view of an embodiment of the present invention mounted on a vehicle with the tailgate removed showing one step in the loading process.
Figure 3:
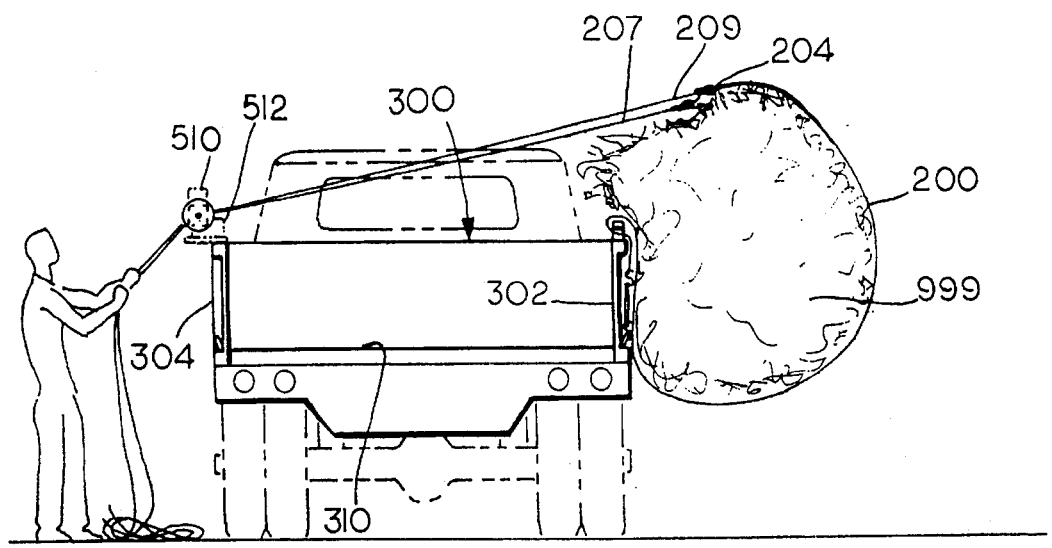
FIG. 3 is rear elevational view of an embodiment of the present invention in the operational mode mounted on a vehicle with the tailgate removed showing another step in the loading process.

To begin the loading operation as shown in FIGS. 2 & 3, tarp 200 is spread out flat on the ground immediately adjacent to first side wall 302 of vehicle bed 300. Near edge 202 of tarp 200 is pulled by hand over guide bar 605, threaded back through slot 615, and draped down along the outside of first side wall 302. Near edge 202 of tarp 200 is then secured to the outside of first side wall 302 with tarp straps 220 and tie-down hooks 320 or the like, best shown in FIG. 6.

Ropes or other lines may be used to assist in winding up tarp 200 onto roller 405 so that excessively long tarps may be avoided. In the preferred embodiment, for example, front line 207 is attached to the corner of tarp 200 formed at far edge 204 and front edge 206, preferably secured to a front grommet (not shown) sewn into tarp 200. Similarly, rear line 209 is attached to the corner of tarp 200 formed at far edge 204 and rear edge 208, preferably secured to a rear grommet (not shown) sewn into tarp 200. Front line 207 extends from the front grommet (not shown) to roller 405 near front wall 306, is threaded through hollow roller 405, and wound around roller drum 410, best shown in FIGS. 4 & 5. Rear line 209 extends from rear grommet (not shown) directly to roller drum 410.

To operate the tarp loader as shown in FIGS. 2 & 3, material 999 is placed onto the surface of tarp 200. The operator first ensures that front and rear lines 207 and 209 are started on roller drum 410. The operator starts motor 510 at control panel 530 causing roller 405 to wind up front and rear lines 207 and 209. Far edge 202 of tarp 200 is pulled over material 999, over first side wall 302, across truck bed 300 to roller 405. As roller 405 continues to wind up tarp 200, material 999 is lifted up and over first side wall 302 by tarp 200, and is ultimately deposited onto floor 310 of vehicle bed 300. The operator halts the rotation of roller 405 when tarp 200 is stretched taut across the top of vehicle bed 300. Material 999 may then be hauled in a conventional manner with no risk to either the material or the general public.

In an alternate embodiment, shown in FIGS. 7–15, the tarp loader is constructed such that both a loading and unloading operation is possible. The device is similar to that previously described with the exception of roller 405 configuration and placement.

Figure 8:
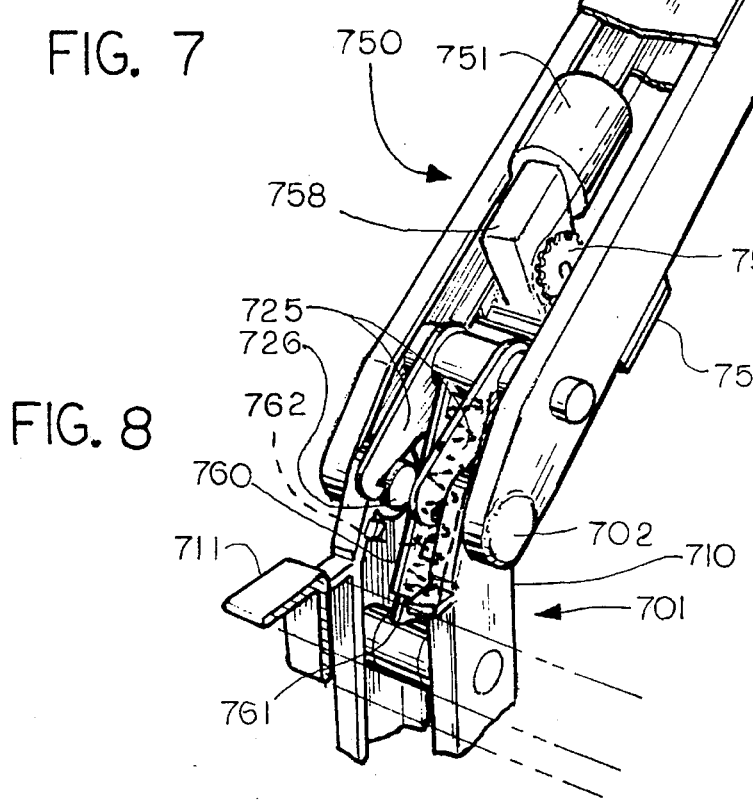
FIG. 8 is an expanded perspective view of the primary pivot arm assembly of the alternate embodiment.
Figure 9:
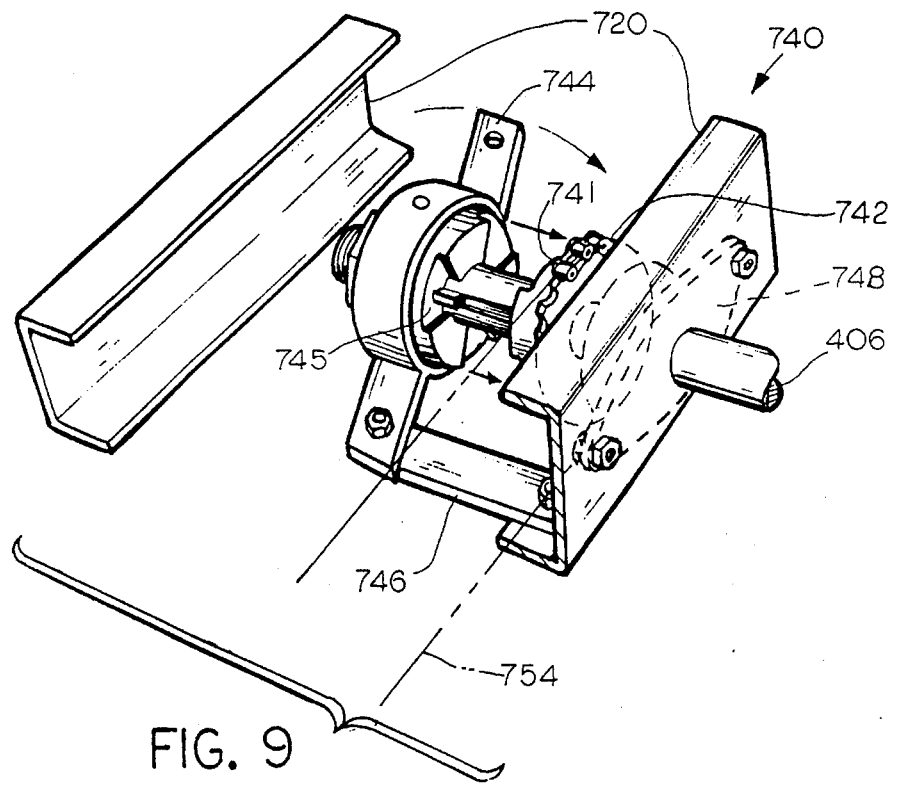
FIG. 9 is a further expanded view of the clutch assembly mounted on the primary pivot arm assembly of the alternate embodiment.
Figure 10:
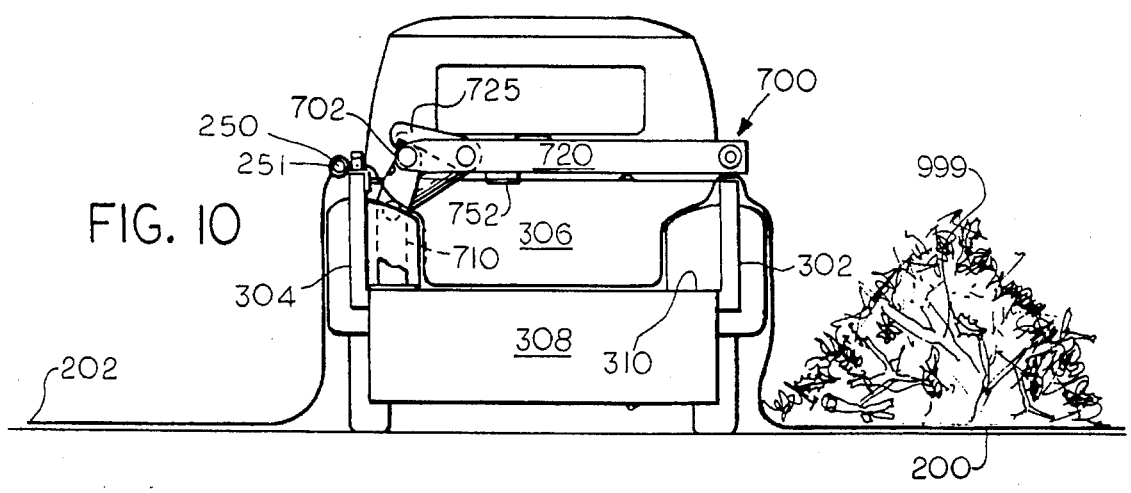
FIG. 10 is a rear elevational view of the alternate embodiment showing one step in the loading process.
Figure 14:
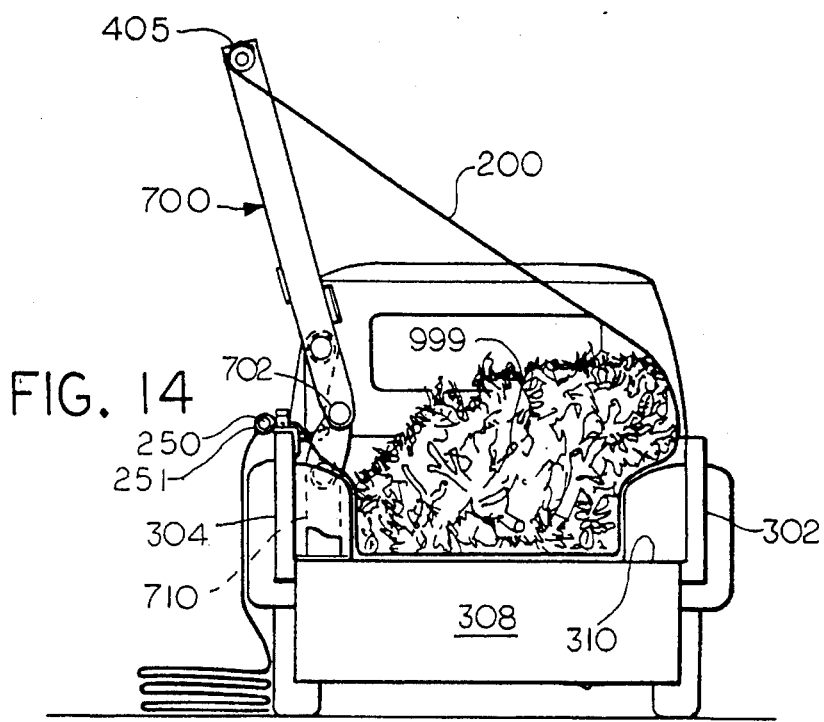
FIG. 14 is a rear elevational view of the alternate embodiment showing one step in the unloading process.
Figure 15:
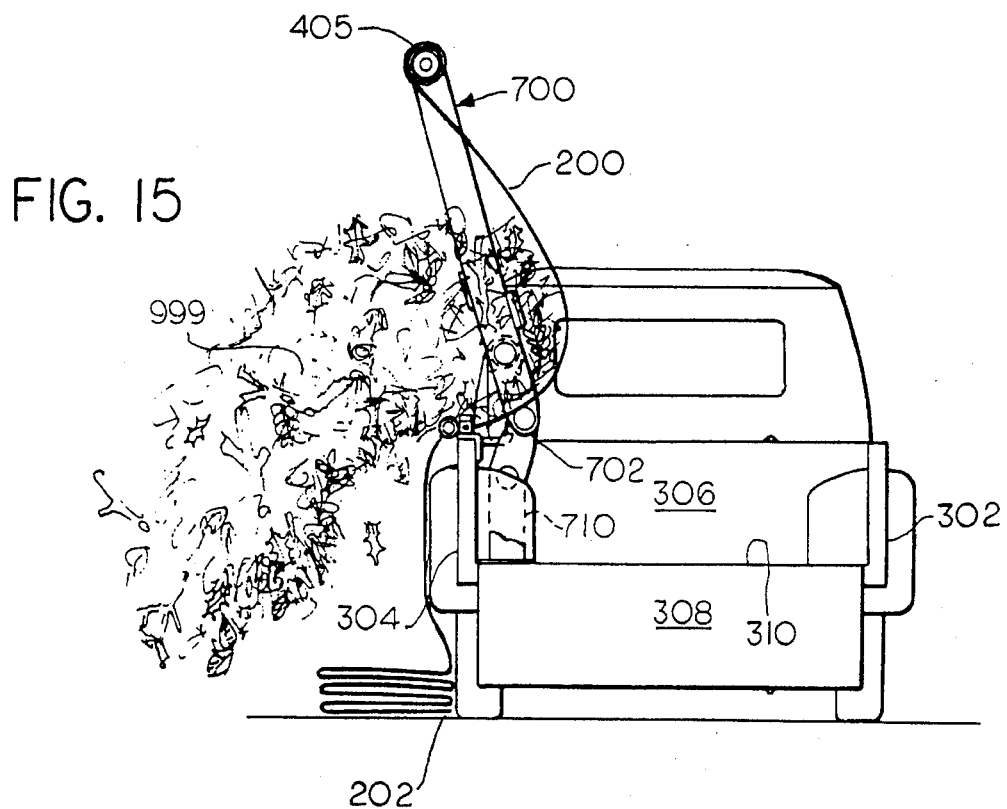
FIG. 15 is a rear elevational view of the alternate embodiment showing the final step in the unloading process.

The alternate embodiment utilizes primary pivot arm assembly 700 in conjunction with roller 405, best shown in FIG. 8. Lower end 701 of primary pivot arm assembly 700 is mounted to second side wall 304. Mounting angle 711 is welded or otherwise attached to second wall 304 and primary pivot arm support 710 is attached to mounting angle 711. Two primary pivot arm members 720 are attached to primary pivot arm support 710 such that primary pivot arm members 720 are rotatable about pivot point 702. Primary pivot arm stop (not shown) is attached to primary pivot arm member 720 and abuts an external cab bulkhead (not shown) when primary pivot arm assembly 700 is in the "load" position.

A dampening system is provided to mitigate a free-fall of primary pivot arm assembly 700. Pivot arm piston 761 slidably engages pivot arm cylinder 760 which contains adjustable snubber spring 762. As primary pivot arm assembly 700 pivots downward due to gravity, snubber spring (not shown) is stretched, thus dampening the downward movement, ultimately avoiding damage to equipment due to excessive impact. Snubber spring 762 can be adjusted to provide the correct force necessary to dampen but not entirely prevent the movement of primary pivot arm assembly 700.

Motor arrangement 750 is mounted to primary pivot arm members 720 using motor support 752. Motor 751 is connected to gear box 758, which in turn is connected to drive gear 756, which engages drive chain 754. Motor control 775 may be mounted on the exterior of the vehicle, as described in the previous embodiment, or may be connected to a power source inside the cab of the vehicle, as depicted in FIG. 7, and fitted with flexible cord 776 for remote use.

Clutch assembly 740 allows roller 405 to be functionally disconnected from drive chain 754 for maintenance or other situations when it is necessary for roller 405 to spin freely. Clutch assembly 740 is mounted at upper end 703 of primary pivot arm assembly 700, best shown in FIG. 9, and is a standard jaw clutch arrangement. Clutch lever 744 is mounted to cross member 746 by welding, bolting, or equivalent means. Clutch lever 744 retains outboard clutch disc 745, which is fixed to roller axle 406. Inboard clutch disc 741 is fixed to clutch sprocket 742, both of which rotate freely about roller axle 406. Roller bearing 748 facilitates the rotation of roller axle 406 as it passes through an opening in primary pivot arm member 720. To disengage drive chain 754 from roller 405, clutch lever 744 is urged away from roller and outboard clutch disc 745 disengages from inboard clutch disc 741. To engage drive chain 754 with roller 405, clutch lever is urged toward roller 405 until outboard clutch disc 745 engages inboard clutch disc 741, thus allowing the power of drive chain 754 to be transferred to roller 405.

Primary pivot arm safety covers 730 are attached as shown in FIG. 8 to prevent injury to operators and to avoid damage to pivot arm components from falling debris.

Figure 7:
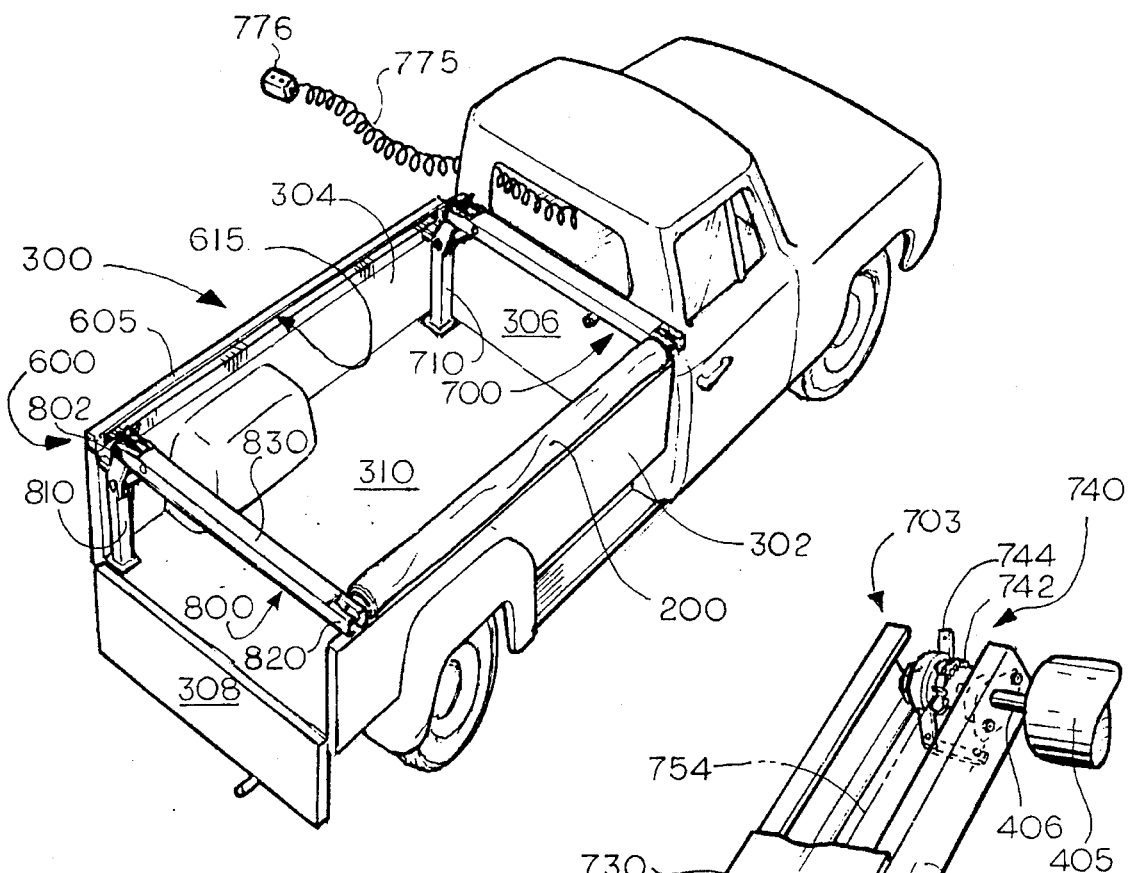
FIG. 7 is a perspective view of an alternate embodiment of the present invention mounted on a vehicle.

Secondary pivot arm assembly 800, shown only in FIG. 7, is similar in its structure to primary pivot arm assembly 700 except that there is no motor arrangement 750 or clutch assembly 740. Mounting angle (not shown) is welded or otherwise attached to second side wall 304 and secondary pivot arm support 810 is attached to mounting angle (not shown). Two secondary pivot arm members 820 are attached to secondary pivot arm support 810 such that secondary pivot arm members 820 are rotatable about pivot point 802. Secondary pivot arm safety covers 830 are attached to prevent injury to operators and to avoid damage to pivot arm components from falling debris.

Guide bar assembly 600 is securely mounted on second side wall 304 in a manner identical to that described in the previous embodiment.

For increased hauling capacity, optional folding extension panels (not shown) may be used. Extension panels are approximately the same size as the four walls of vehicle bed 300 and are hingedly attached to the top of each of the four walls. When increased hauling capacity is needed, the four extension panels are swung up and locked in place by suitable fastening means (not shown). When increased hauling capacity is not needed, the four extension panels are folded down and secured to the respective walls of vehicle bed 300.

The loading operation is as follows, shown in FIGS. 9–13. Primary and secondary pivot arm assemblies 700 and 800 start in the substantially horizontal "load" position, with a primary pivot arm stop (not shown) resting on an external cab bulkhead (not shown). Primary and secondary pivot arm members 720 and 820 are of sufficient length so that when they are in the "load" position, roller 405 is positioned proximate to the top of first side wall 302. Tarp 200 is manipulated, either manually (using the clutch assembly 740 to disengage drive chain 754 from roller 405) or by driving roller 405 with motor arrangement 750, such that one portion is stretched out on the ground adjacent first side wall 302 (as in the previously described loading process) and the middle portion is draped across floor 310 of vehicle bed 300. Near edge 202 of tarp 200 is fed through guide slot 615 and secured to the outside of second side wall 304 via tarp straps 220 and tie-down hooks 320. As an alternate means for securing near edge 202 to second side wall 304, a dowel rod and pocket combination may be used. Dowel pocket 251 is sewn into tarp 200 proximate to and running along near edge 202. After near edge 202 is fed through slot 615, dowel rod 250 having a diameter greater than the width of slot 615 is inserted into dowel pocket 251, thus preventing tarp 200 from being pulled back through slot 615 in the direction toward near wall 302.

Material 999 to be loaded is placed onto the upper surface of tarp 200 stretched out on the ground in a manner identical to that described above. Far edge 204 of tarp 200 is then pulled over material 999 and attached to roller 405 via a hook-and-loop arrangement or equivalent. The operator starts motor 751 using motor control 775 which may be connected to a power source (not shown) in the cab of the vehicle or mounted on the exterior of the vehicle. Motor arrangement 750 propels drive chain 754 which engages clutch sprocket 742 and roller 405 is rotated in a manner identical to that described above for the preferred embodiment of the present invention. As tarp 200 is wound onto roller 405, primary and secondary pivot arm assemblies 700 and 800 rotate up about pivot points 702 and 802, respectively, allowing roller 405 to follow the bulk of material 999, which is encased in tarp 200, as it passes along and then over first side wall 302 and into vehicle bed 300. After material 999 is deposited into vehicle bed 300, rotation of roller 405 is halted. Near edge 202 of tarp 200 is unattached from the outside of second side wall 304 and reattached to roller 405. Rotation of roller 405 is again initiated and tarp 200 is drawn tighter together and material 999 is compressed within the tightened tarp 200 in vehicle bed 300. The load is now stable and secure in bed 300, ready to safely transport.

The unloading procedure is as follows. Near edge 202 is freed from roller 405, motor arrangement 750 is activated and roller 405 is rotated such that a portion of tarp 200 is unwound from roller 405, then motor 751 is stopped. Taking advantage of the slack created in tarp 200, primary and secondary pivot arm assemblies 700 and 800 are then pivoted up and away from the "load" position and locked in the upright "unload" position using pivot arm lock 725 which engages pivot arm lock pins 726 to hold pivot arm assembly 700 in place (an identical lock, not shown, is used on secondary pivot arm assembly 800). Near edge 202 of tarp 200 is then fed through guide slot 615 and is again temporarily attached to the outside of second side wall 304 using a hook-and-loop arrangement or equivalent. The operator again starts motor 751 and roller 405 is again rotated. As tarp 200 is wound back onto roller 405, material 999 is lifted up along second side wall 304 by tarp 200 and is ultimately lifted over second side wall 304 and ejected onto the ground adjacent to the vehicle. After material 999 is unloaded, motor 751 is stopped and near edge 202 of tarp 200 is unattached from second side wall 304. The operator starts motor 751 and continues to rotate roller 405 until tarp 200 is completely wound onto roller 405 and fastened securely thereupon.

If it is desirable to unload material 999 over first side wall 302 instead of second side wall 304, a simple change is required. Instead of attaching near edge 202 of tarp 200 to the outside of second side wall 304 and attaching far edge 204 to roller 405, the reverse is done: far edge 204 of tarp 200 is attached to the outside of first side wall 302 and near edge 202 is attached to roller 405. With the situation reversed as described, roller 405 winds up tarp 200, ultimately carrying material 999 up and over first side wall 302.

After unloading is complete, the vehicle is then ready, with stowed tarp, for the next job assignment.

What is claimed is:

1. A device for loading and unloading material, said device comprising:

a receptacle, said receptacle comprising a first side wall, a second side wall, a front wall, a rear wall, a floor and an open top;

a guide bar, said guide bar extending longitudinally along said first side wall, said guide bar affixed to said first side wall such that a slot is formed between said guide bar and said first side wall;

a roller, said roller extending longitudinally along said second side wall;

means for supporting said roller, said means for supporting said roller comprising a primary pivot arm and a secondary pivot arm, said primary and said secondary pivot arms each having a lower end and an upper end, said lower end of said primary pivot arm being pivotally attached to said second side wall, said lower end of said secondary pivot arm being pivotally attached to said second side wall, said roller being rotatably attached to both said upper end of said primary pivot arm and said upper end of said secondary pivot arm;

a tarp, said tarp having a near edge, a far edge, a top edge, and a bottom edge, said tarp being used to carry material into said receptacle while simultaneously being wound onto said roller;

means for rotating said roller in a clockwise and counterclockwise direction;

means for securing said near edge of said tarp to said first side wall; and, means for affixing said tarp to said roller.

2. The device according to claim 1 further comprising means for locking said primary pivot arm and said secondary pivot arm in at least one upright position, said position being above a horizontal plane defined by the top of said first side wall and the top of said second side wall.

3. The device according to claim 2 wherein said means for driving said roller is mounted on said primary pivot arm.

4. The device according to claim 3 further comprising means for absorbing the shock of said primary pivot arm as said primary pivot arm pivots downward from said at least one upright position due to the force of gravity.

5. The device of claim 4 wherein said shock absorber means comprises a snubber spring, a pivot piston, and a pivot cylinder, said pivot cylinder attached to said second side wall of said container, said pivot piston slidable engaging said pivot cylinder, said snubber spring being attached to said pivot cylinder and said pivot cylinder, said pivot cylinder being attached to said primary pivot arm.

6. The device according to claim 1 wherein said means for driving said roller further comprises means for functionally disconnecting said drive means from said roller.

7. The device according to claim 6 wherein said means for functionally disconnecting said drive means from said roller comprises a clutch arrangement.

8. The device according to claim 1 further comprising means for attaching said near edge of said tarp to said second side wall.

9. The device according to claim 8 wherein said means for attaching said near edge of said tarp to said second side wall comprises a hook-and-loop arrangement.

10. The device according to claim 8 wherein said means for attaching said near edge of said tarp to said second side wall comprises a dowel rod and dowel pocket, said dowel pocket being sewn into said tarp proximate to said near edge, said dowel rod having a diameter greater than the width of said slot.

11. A method of loading material into and unloading material from a receptacle having an open top, said method comprising the steps of:

placing a tarp flat on the ground adjacent to said receptacle;

securing a first edge of said tarp to a first side wall of said receptacle;

placing material onto the upper surface of said tarp;

securing a second edge of said tarp to a roller arrangement, said second edge being opposite to said first edge, said roller arrangement comprising a roller, said roller being located proximate to a second side wall of said receptacle;

winding up said tarp onto said roller, whereby deploying said tarp across the open top of said receptacle while simultaneously lifting said material up and over a second side wall into said receptacle; and, halting the winding up of said tarp onto said roller when said material is deposited in said receptacle and when said tarp is deployed across said open top of said receptacle.

12. The method according to claim 11 wherein said roller arrangement further comprises a motor and a drive means.

13. The method according to claim 12 further comprising the steps of:

pulling said first edge of said tarp over a guide rail, said guide rail mounted to said first side wall whereby forming a slot between said guide rail and said first side wall;

threading said first edge of said tarp back through said slot between said guide rail and said first side wall.

14. The method according to claim 12 further comprising the steps of:

unwinding said tarp from said roller;

simultaneously pivoting a primary and a secondary pivot arm in an upward direction, said roller rotatably mounted between the upper end of said primary pivot arm and the upper end of said secondary pivot arm;

locking said primary and said secondary pivot arms in a position above a horizontal plane;

winding up said tarp onto said roller while simultaneously carrying said material up and over said first side wall whereby unloading said material onto the space adjacent to said receptacle.

15. The method according to claim 12 further comprising the steps of:

unwinding said tarp from said roller;

simultaneously pivoting a primary and a secondary pivot arm in an upward direction, said roller rotatably mounted between the upper end of said primary pivot arm and the upper end of said secondary pivot arm;

locking said primary and said secondary pivot arms in a position above a horizontal plane;

winding up said tarp onto said roller while simultaneously carrying said material up and over said second side wall whereby unloading said material onto the space adjacent to said receptacle.

16. A loading device for moving bulk material from an external position into an open-top receptacle, said receptacle having a pair of opposing sides extending between opposed ends, said device comprising:

an elongate roller extending along and generally coextensive with one of said sides;

a flexible sheet for loading and covering said material, said sheet having a width generally coextensive with said sides of said receptacle, said sheet having a length measured transverse to said sides and extending between a leading edge and a trailing edge;

means for releasably securing said trailing edge of said sheet to one of said sides of said receptacle;

means for driving said roller in a first direction to wrap said sheet thereupon whereby entrapping said bulk material below said sheet into said receptacle; and, means for driving said roller in a second direction for causing said sheet to unwrap therefrom.

* * * * *